US011022822B2

(12) United States Patent
Trim et al.

(10) Patent No.: US 11,022,822 B2
(45) Date of Patent: Jun. 1, 2021

(54) CONTEXT AWARE DYNAMIC COLOR CHANGING LENSES

(71) Applicant: International Business Machines Corporation, Armonk, NY (US)

(72) Inventors: Craig M. Trim, Ventura, CA (US); Rashida A. Hodge, Ossining, NY (US); Gandhi Sivakumar, Bentleigh (AU); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 16/198,995

(22) Filed: Nov. 23, 2018

(65) Prior Publication Data
US 2020/0166781 A1    May 28, 2020

(51) Int. Cl.
| G02C 11/00 | (2006.01) |
| G02C 7/10 | (2006.01) |
| G06F 16/29 | (2019.01) |
| G06F 16/9537 | (2019.01) |

(52) U.S. Cl.
CPC .............. *G02C 11/10* (2013.01); *G02C 7/101* (2013.01); *G06F 16/29* (2019.01); *G06F 16/9537* (2019.01)

(58) Field of Classification Search
None
See application file for complete search history.

(56) References Cited

U.S. PATENT DOCUMENTS

| 5,114,218 A | 5/1992 | Black et al. |
| 7,874,666 B2 | 1/2011 | Xu et al. |
| 8,752,963 B2 | 7/2014 | McCulloch et al. |
| 8,947,322 B1 | 2/2015 | Chi |
| 9,140,910 B2 | 9/2015 | Filutowski et al. |
| 9,482,880 B1 | 11/2016 | Chandrasekhar et al. |
| 10,021,474 B2 | 7/2018 | Abreu |
| 2008/0258999 A1 | 10/2008 | Van Doorn |
| 2012/0206050 A1 | 8/2012 | Spero |
| 2013/0114043 A1 | 5/2013 | Balan |

(Continued)

FOREIGN PATENT DOCUMENTS

| CN | 201322828 | 10/2009 |
| CN | 105759457 | 7/2016 |

(Continued)

OTHER PUBLICATIONS

Eriksson et al., "SKUGGA: Sunglasses with Variable Electronic Tint Control," Master of Science Thesis, MMK 2016:04 IDE 171, KTH Industrial Engineering and Management, Machine Design, SE-100 44 Stockholm, Sweden, 2016, 63 pages.

(Continued)

*Primary Examiner* — David Perlman
(74) *Attorney, Agent, or Firm* — VanLeeuwen & VanLeeuwen; Christopher M. Pignato

(57) ABSTRACT

An approach is provided in which a lens system receives a set of location data corresponding to a location of a user wearing the lens system. Next, the lens system matches the set of location data to a location context entry stored in a storage area and, in turn, adjusts an appearance of the lens system based on a set of lens configuration attributes corresponding to the matched location context entry.

20 Claims, 20 Drawing Sheets

(56) References Cited

U.S. PATENT DOCUMENTS

| | | | |
|---|---|---|---|
| 2014/0245784 A1* | 9/2014 | Proud | G06Q 40/04 63/1.11 |
| 2015/0015573 A1* | 1/2015 | Burtzlaff | G06F 3/041 345/419 |
| 2016/0170206 A1* | 6/2016 | Osborne | G02F 1/163 345/8 |
| 2017/0336641 A1 | 11/2017 | Von Und Zu Liechtenstein | |
| 2018/0012091 A1* | 1/2018 | Ricci | A61B 5/1171 |
| 2018/0136490 A1 | 5/2018 | Yang | |
| 2018/0144714 A1 | 5/2018 | Khorasani | |
| 2018/0187484 A1 | 7/2018 | Hebeisen et al. | |
| 2019/0079316 A1* | 3/2019 | Ballet | G02C 7/083 |

FOREIGN PATENT DOCUMENTS

| | | |
|---|---|---|
| CN | 106249432 | 12/2016 |
| WO | 2015173044 | 11/2015 |
| WO | 2017124763 | 7/2017 |

OTHER PUBLICATIONS

Bader et al, "Interacting with LCD-Based Smart Windows," In Proceedings of the 6th International Conference on the Internet of Things (IoT'16), Stuttgart, Germany, Nov. 2016, 175-176.

"Watson Speech to Text," International Business Machines Corporation, 2015, 7 pages.

"Watson Visual Recognition," International Business Machines Corporation, 2015, 4 pages.

John, "What is Electrochromic Glass?" SmartGlass International, Sep. 2010, 3 pages.

Woodford, "'Smart' windows (electrochomic glass)," Explain that Stuff, May 2017, 9 pages.

"How can my glasses change from transparent, when I'm inside, to dark when I go outdoors?" howstuffworks, 2018, 4 pages.

Due, "The future of smart glasses: An essay about challenges and possibilities with smart glasses," Working papers on interaction and communication 1(2), 1-21, 2014, Centre of Interaction Research and Communication Design, University of Copenhagen, 21 pages.

Yvonne, "High Technology Glass with Privacy Smartglass," SmartGlass International, Oct. 2017, 4 pages.

"List of IBM Patents or Patent Applications Treated as Related," Letter from Leslie A. Van Leeuwen, Nov. 23, 2018, 1 page.

Trim et al., "Cognition Enabled Dynamic Color Changing Lenses," U.S. Appl. No. 16/198,987, filed Nov. 23, 2018, 57 pages.

\* cited by examiner

| SITUATIONAL CONTEXT CONFIGURATION TABLE 700 ||||||
| :---: | :---: | :---: | :---: | :---: |
| DESCRIPTION | REFERENCE FILES | PRIORITY | EYEWEAR CONFIGURATION ATTRIBUTES ||
| ||| COLOR | OPACITY |
| Friend | image1 | 2 | | |
| Supervisor | image 2, audio2 | 1 | | |
| Co-worker | image 3 | 1 | | |
| Party | image set 1, audio 3, keyword file 1 | 3 | | |
| Business Meeting | image set 2, audio 4, keyword file 1, keyword file 2 | 1 | | |
| Reading | image 5 biometric 1 | 2 | | |
| Tired | biometric 2 | 3 | | |
| Picture Taking | image 6 | 3 | | |
| | | | | |

710 — (DESCRIPTION), 720 — (REFERENCE FILES), 730 — (PRIORITY), 740 — (COLOR), 750 — (OPACITY)

760 — Friend, 765 — Supervisor, 770 — Co-worker, 775 — Party, 780 — Business Meeting, 785 — Reading, 790 — Tired, 795 — Picture Taking

FIG. 7

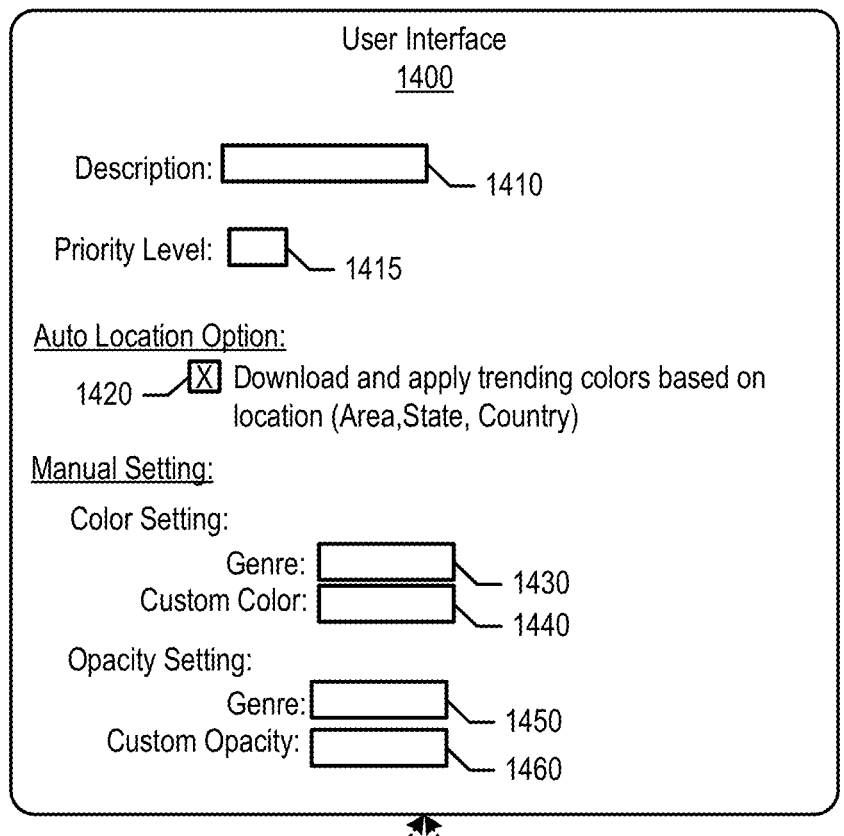
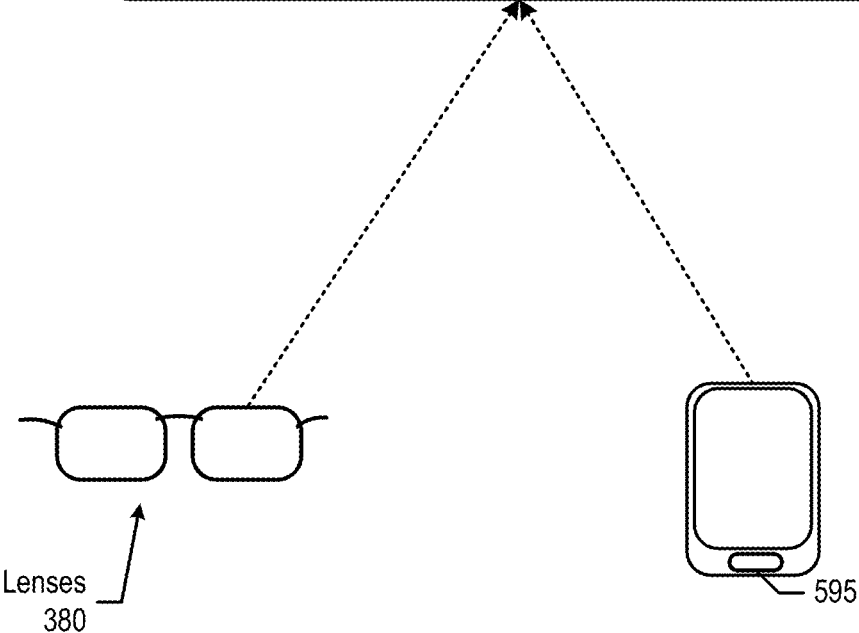
FIG. 14

| LOCATION CONTEXT CONFIGURATION TABLE 1600 | | | | |
|---|---|---|---|---|
| DESCRIPTION | KEYWORDS, REFERENCE FILES, WEATHER DATA, LOCATION | PRIORITY | EYEWEAR CONFIGURATION ATTRIBUTES | |
| | | | COLOR | OPACITY |
| Tunnel | keyword1, keyword2 | 1 | | |
| Underground Parking | keyword 3 | 1 | | |
| Church | keyword 4 | 1 | | |
| Time of Day | keyword 5 | 2 | | |
| Picnic Spot | keyword 6 | 2 | | |
| Foggy | file1, keword8 | 2 | | |
| Overcast | file2, keyword9 | 3 | | |
| Sunny | file3, keyword10 | 2 | | |
| College Campus | keyword7, location | 2 | | |

CONTEXT AWARE DYNAMIC COLOR CHANGING LENSES

BACKGROUND

Industry trends are emerging towards cognitive entities (CE), which are cognitive models enabled via a Big Data platforms. Cognitive entities are intended to remember the past, interact with humans, continuously learn, and refine future responses. Cognitive entity capabilities enrich the automation of human needs based on time and situation, and also provide more dynamic responses and user satisfaction. Some cognitive entities receive audio-visual data from interconnected components to assist their corresponding cognitive algorithms in better decision making by analyzing the audio-visual data. This analysis also enables system acquaintance and maturity over time.

With the emerging Nano-technology and progression in the material science, new glasses are designed that are capable of changing their color based on an input current and voltage provided by a controller to the glass. Electrochromic glass, also known as smart glass or electronically switchable glass, is an innovative and modern building glass that can be used to create partitions, windows, or skylights. Electrochromic glass is also used to control the amount of heat or light that passes through the glass at the flick of a switch, giving the glass the ability to regulate temperatures or create privacy.

Electrochromic glass utilizes a principle of electrochromism, which allows certain materials to change color or even opacity when a burst of charge is applied. While a small burst of electricity is required for changing the opacity of the glass, no electricity is needed for maintaining a particular shade once the glass implements the change.

BRIEF SUMMARY

According to one embodiment of the present disclosure, an approach is provided in which an eyewear system receives a set of location data corresponding to a location of a user wearing the eyewear system. Next, the eyewear system matches the set of location data to a location context entry stored in a storage area and, in turn, adjusts an appearance of the eyewear system based on a set of eyewear configuration attributes corresponding to the matched location context entry.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) receiving, by an eyewear system, a set of location data corresponding to a location of a user wearing the eyewear system; (ii) matching the location data to a selected one of a plurality of location context entries stored in a storage area, wherein the selected location context entry comprises a set of eyewear configuration attributes; and (iii) adjusting an appearance of the eyewear system based on the set of eyewear configuration attributes.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 7 is an exemplary diagram depicting situational context configuration table entries;

FIG. 14 is an exemplary user interface window that allows a user to configure smart the smart based on location contexts;

FIG. 16 is an exemplary diagram depicting location context configuration table entries;

DETAILED DESCRIPTION

Figure 1:
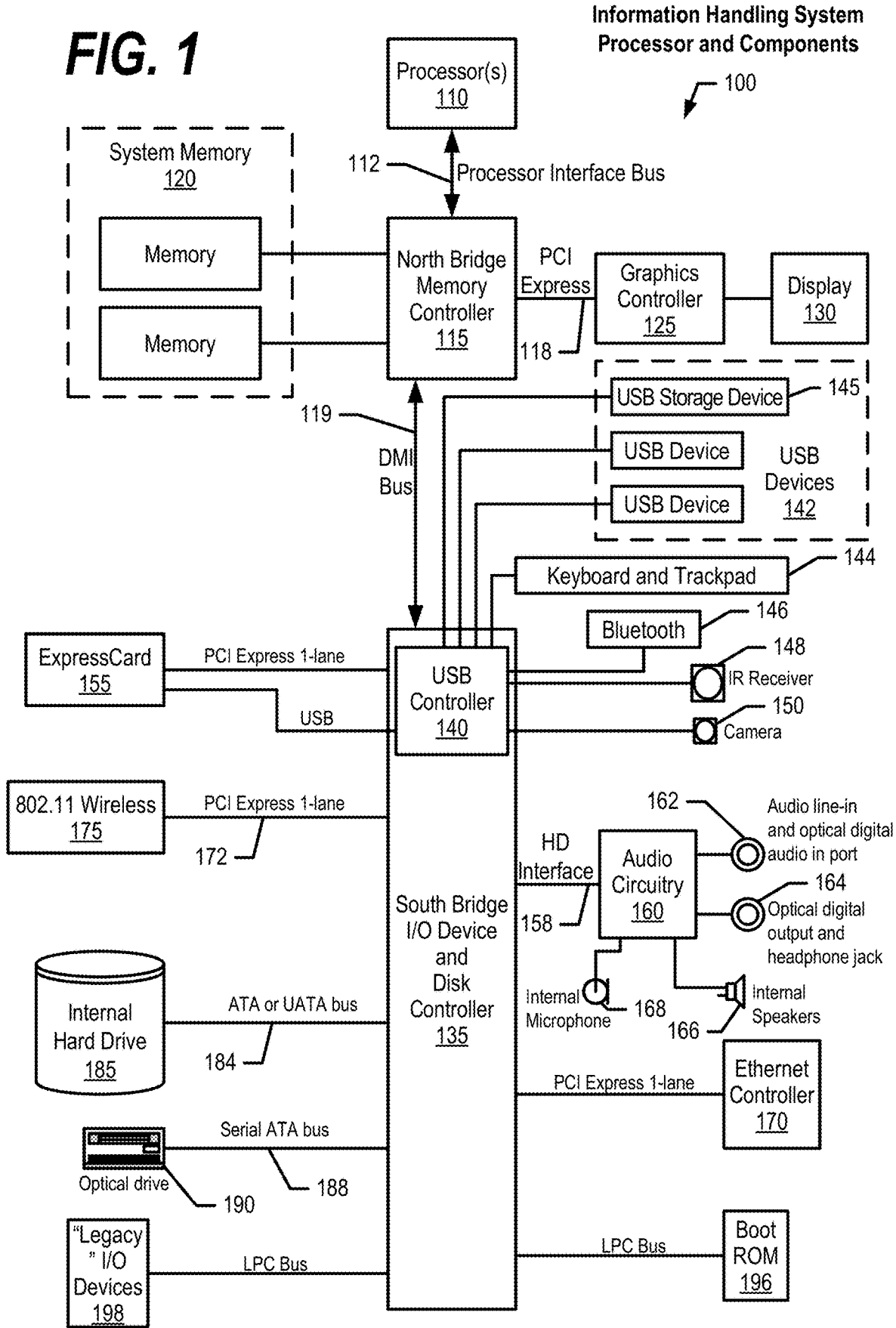
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
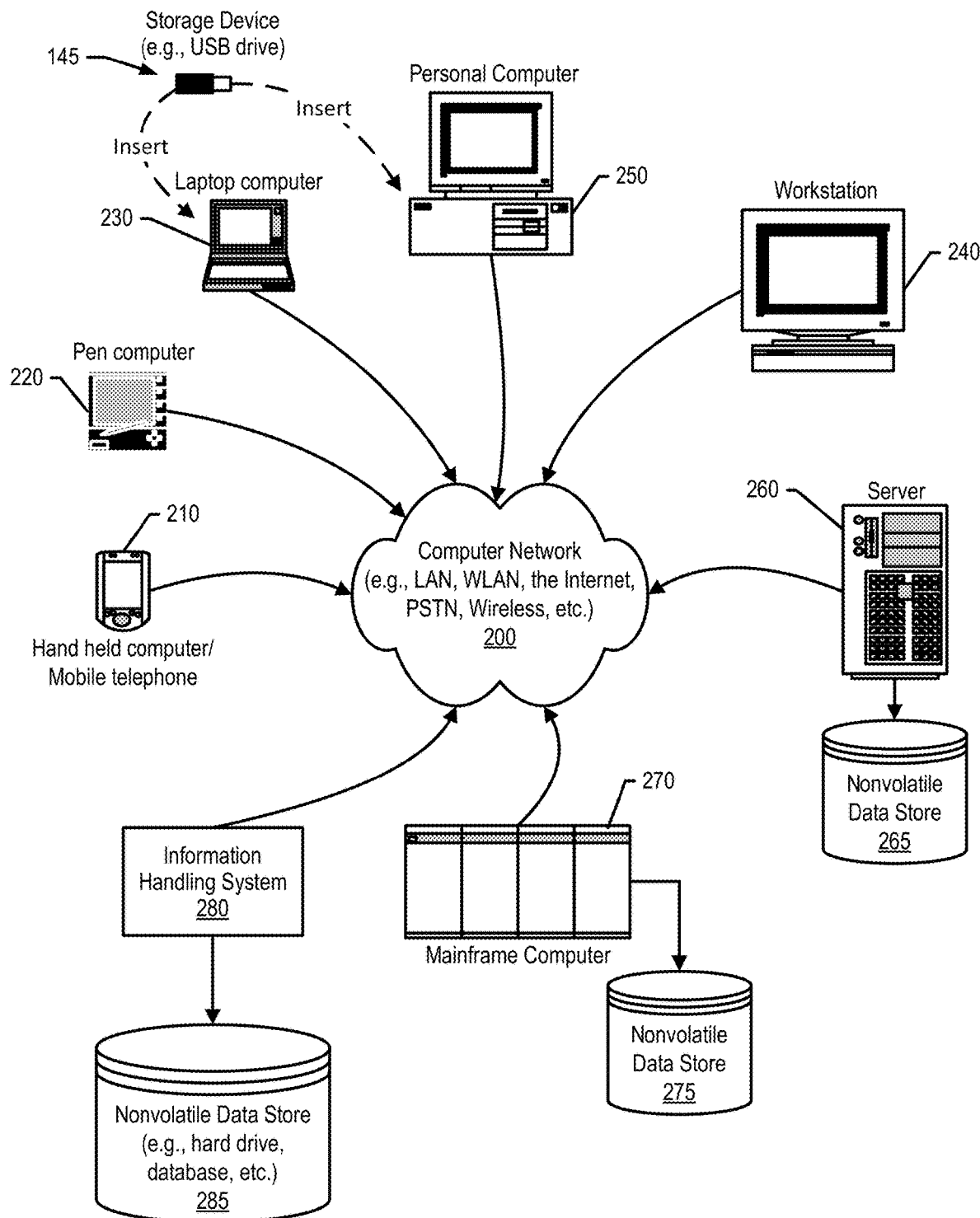
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

In today's world, eyewear is very static in color and opacity. Although some eyewear is available that change color based on a surrounding brightness, the eyewear only provides a dark shade and a light shade and is not configurable by a user or based on a user's situation, such as being in a business meeting, attending a party, meeting a friend, etc. FIGS. 3 through 11 depict an embodiment that can be executed on an information handling system, such as a smart eyewear system, that dynamically adjusts its appearance based on a current situational context of a user. The smart eyewear system co-exists with smart device monitoring tools, collects sensory data (audio-visual information) of the surrounding area from a camera/microphone placed on the eyewear system, identifies the situation (people, event, etc.) and instructs an electrochromic glass controller to tune the color and opacity of lenses accordingly. In one embodiment, the smart eyewear system integrates with a personality insights database and audio-visual object identification modules to further determine the situational context of the area proximate to the user.

FIGS. 12 through 20 depict another embodiment that can be executed on an information handling system, such as the smart eyewear system. The smart eyewear system collects information from various location, weather, and Internet situated resources via nearby IoT (Internet of Things) enabled devices and identifies the user's current location, movement, future location, travel points, and surrounding weather, and adjusts the color and opacity of the lenses based on the insights collected. In this embodiment, the smart eyewear system integrates with weather systems, GPS location services, and IoT components (e.g., roadside transmitters) to improve the system accuracy of the smart eyewear system.

Figure 3:
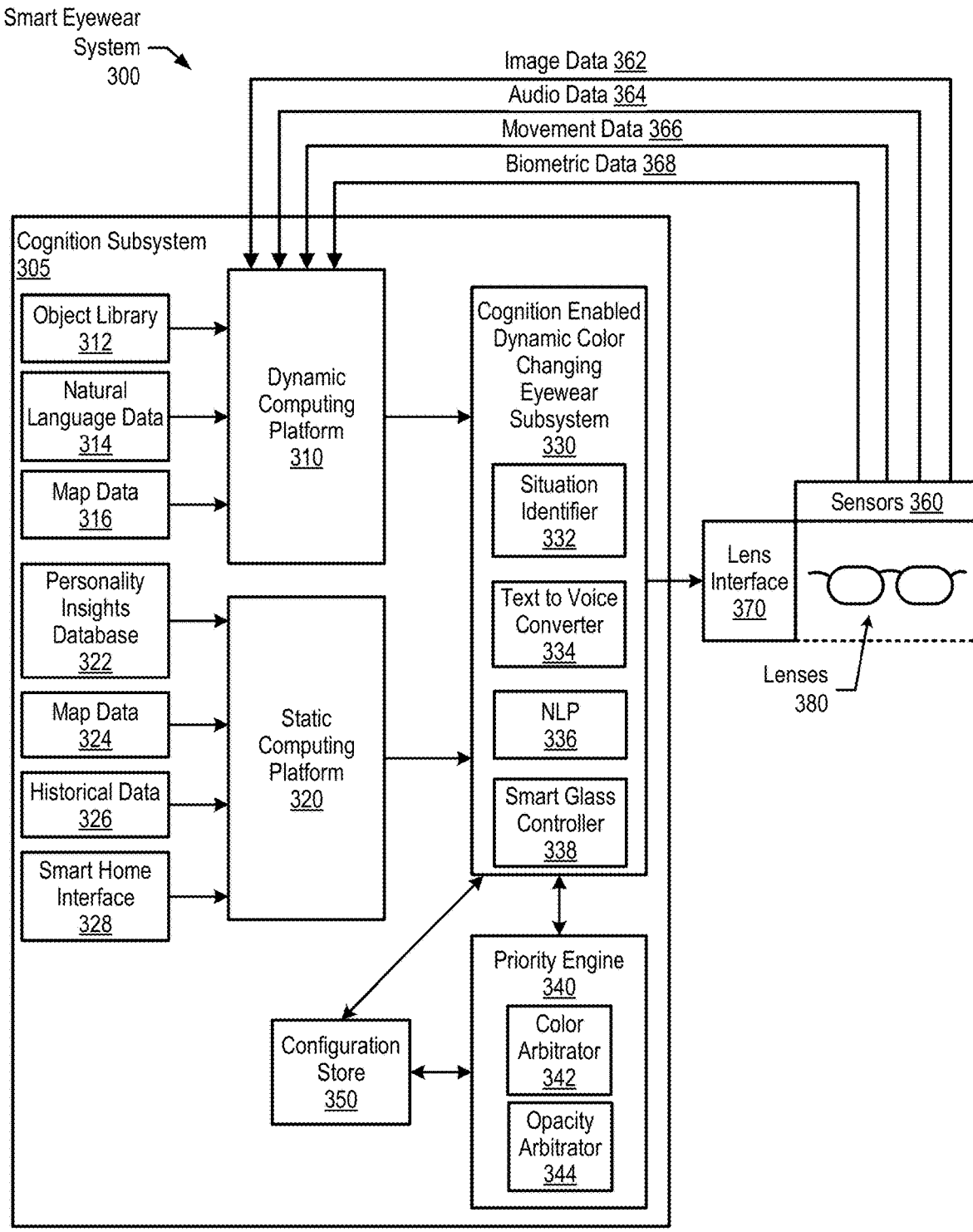
FIG. 3 is an exemplary diagram depicting a smart eyewear system that adjusts color/opacity of lenses in the smart eyewear system based on situational contexts in proximity of a user.

FIG. 3 is an exemplary diagram depicting a smart eyewear system that adjusts color/opacity of lenses in the smart eyewear system based on situational contexts. As defined herein, lenses refer to any substantially transparent pane and is not limited to corrective lenses or magnifying lenses. Smart eyewear system 300 collects sensory data corresponding to an area proximate to a user and configures a lens color and opacity based on matching the collected information against a set of situational context entries. In one embodiment, smart eyewear system 300 uses the collected sensory data to detect proximate objects (e.g., party banners, projectors, conference room), proximate individuals (friends, co-workers), proximate audio (party conversation, meeting conversation), etc.

Smart eyewear system 300 includes cognition subsystem 305 that receives sensory information from sensors 360, determines a situational context based on the sensory information, and adjusts the color and opacity of lenses 380 via lens interface 370. Dynamic computing platform 310 gathers movement, trajectory, and interrelated information that are dynamic in nature via image data 362, audio data 364, movement data 366, and biometric data 368 from sensors 360. Dynamic computing platform 310 then analyzes the received sensory data against object library 312, natural language data 314, and map data 316. Object library 312 includes common object references that dynamic computing platform 310 uses to match against image data 362 (e.g., conference table, party banner, etc.). Natural language data 314 includes common language information used to compare against images having text information (e.g., road sign). Map Data 316 includes mapping information to correlate activity to location that is learned over time (e.g., home, office, etc.). In turn, dynamic computing platform 310 generates situational context information that feeds into cognition enabled dynamic color changing eyewear subsystem 330 (see FIG. 8 and corresponding text for further details).

Static computing platform 320 uses personality insights database 322, map data 324, historical data 326, and smart home interface 328 to provide classified data with static information insights to cognition enabled dynamic color changing eyewear subsystem 330. Personality insights database 322 includes personality information of a user such as whether the user is conservative, introverted, etc. In one embodiment, personality insights database 322 includes calendar information of the user that indicates upcoming events (event contexts). Historical data 326 includes past historical settings such at color settings (e.g., custom color settings) the last time person X was in front of the user. Smart home interface 328 connects with a smart home network, such as turning on overhead lights when light levels are low or based on activity of a user, such as when a person is reading newspaper. Smart home interface 328 may also perform tasks such as retrieving online calendar information corresponding to the user that indicates upcoming events.

Cognition enabled dynamic color changing eyewear subsystem 330 includes situation identifier 332, text to voice converter 334, natural language processor (NLP) 336, and smart glass controller 338. Situation identifier matches the input from dynamic computing platform 310 and static computing platform 320 with situational context entries stored in configuration store 350 (see FIGS. 7, 8, and corresponding text for further details). Text to voice converter 334 converts written text (e.g., instructions) to voice that is understood by the user. NLP 336 collects voice data and extracts information from the voice input (e.g., instructions). Smart glass controller 338 controls the color/opacity of lenses 380 via lens interface 370.

Priority engine 340 includes color arbitrator 342 and opacity arbitrator 344, which manage color/opacity settings based on the determined situational context relative to eyewear configuration attributes stored in configuration store 350. Configuration store 350 includes a list of situational context entries and corresponding audio/image files to determine situations and which color/opacity to apply (see FIG. 7 and corresponding text for further details).

In one embodiment, smart eyewear system 300 applies image recognition techniques on image data 362 to detect a situational context of an area proximate to the user (e.g., a friend, a party, a business meeting, etc.) Smart eyewear system 300 then adjusts the appearance of lenses 380 based on a set of corresponding eyewear configuration attributes stored on configuration store 350. For example, during a normal day, a user prefers an eyewear with transparent glass, but when the user is at a party, the user prefers the lenses to look stylish and fashionable. As such, when smart eyewear system 300 detects a party scene, smart eyewear system 300 dynamically changes the lens color to a relevant stylish view and/or a lens color to match the surrounding area. For example, if the user is wearing red clothes, smart eyewear system 300 configures lenses 380 to a red color. In another example, the smart eyewear system 300 dynamically changes the color of the lenses based on the clothing of a person with whom the user is conversing. For example, if the user is having a conversation with a person wearing a yellow shirt, smart eyewear system 300 changes the lens color to yellow. And, when the user begins having a new conversation with a person wearing a green dress, smart eyewear system 300 automatically changes the lens color to green. In yet another example, smart eyewear system 300 detects the person with whom the user is conversing via facial recognition, retrieves social media information corresponding to the person to determine the person's favorite color, and changes the color of lenses 380 based on the person's favorite color.

In another embodiment, smart eyewear system 300 uses biometric data 368 to determine a user's biometric condition and adjust the appearance of lenses 380 accordingly. For example, when smart eyewear system 300 detects that a user is sleepy, assuming the user is not driving or performing complicated tasks, smart eyewear system 300 darkens lenses 380 as preferred by the user.

In another embodiment, when lenses 380 are currently set to a darker shade and the user begins reading a page of text (e.g., newspaper), smart eyewear system 300 recognizes the page of text and changes lenses 380 to a more transparent appearance so the user can effectively read the page of text.

In another embodiment, smart eyewear system 300 provides a graphical user interface (GUI) and/or voice-based interface. In this embodiment, smart eyewear system 300 collects image data 262 and audio data 364, computes for the situational context using the collected inputs, detects for the situational need of the variable parameter of lenses 380, and selectively tunes the parameters based on the time and situation for better user experience. For example, the user may say "darken the glasses" or "change the color from red to yellow." In another embodiment, smart eyewear system 300's GUI based interface allows a user to drag and drop various interfaces, define priorities and interlinks with positive, negative, mixed gestures and leads library.

In another embodiment, smart eyewear system 300 maps collected images to a story and accordingly updates the cognition enabled parameter priorities in configuration store 350. In this embodiment, smart eyewear system 300 captures audio/visual data and maps the data with a situation and updates priorities accordingly. For example, if a person in front of the user is crying, smart eyewear system 300 reconfigures lenses 380 to not look stylish.

In another embodiment, smart eyewear system 300 provides an ability to detect a person in front of the user and change the color autonomously. For example, the user configures smart eyewear system 300 to change to a stylish look when the user is in front of his girlfriend but change to a professional look when the user is in front of his supervisor.

In another embodiment, smart eyewear system 300 provides an ability to configure cognition enabled dynamic color changing eyewear subsystem 330 for inter leads intervals (e.g., continuous or driven by time intervals set or events). In another embodiment, smart eyewear system 300 provides an ability to utilize visual micro camera sensors and audio sensors present in smart homes to compute variables of smart dynamic eyewear configuration attributes. For example, if a smart home camera detects that there is very low light in the room for which the user is entering, the smart home camera informs smart eyewear system 300 and smart eyewear system 300 adjusts the color of the eyewear to transparent for clear visibility.

In another embodiment, smart eyewear system 300 provides in-front object recognition capability to determine the formality of an event and changes the appearance of lenses 380 accordingly. For example, smart eyewear system 300 recognizes a person in front of a user, collects object personality information (e.g., casual dress, formal dress, etc.), and changes the color policy of lenses 380 accordingly.

In another embodiment, smart eyewear system 300 sends the captured set of sensory data to a remote device through an application programming interface (API) to process the set of sensory data (e.g., server 260). Smart eyewear system 300 then receives a set of eyewear configuration attributes from the remote system and applies the set of eyewear configuration attributes to lenses 380 accordingly.

Figure 4:
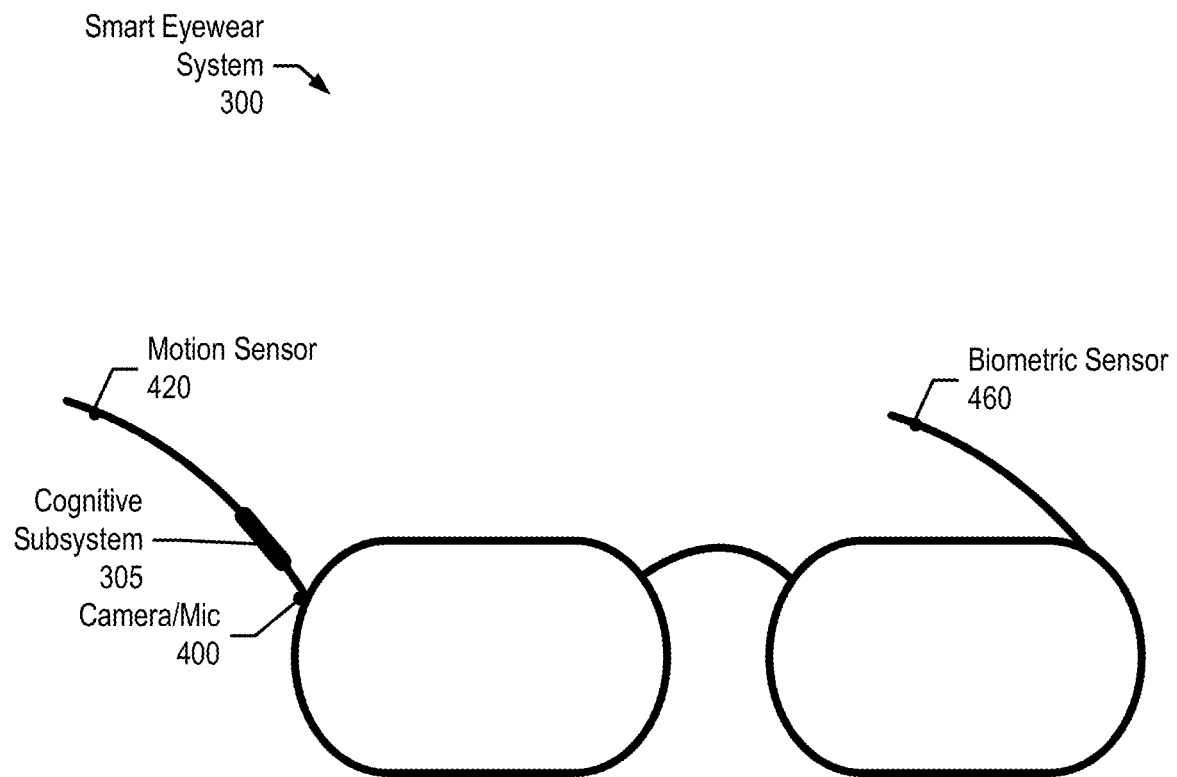
FIG. 4 is an exemplary diagram depicting various sensors placed on a smart eyewear system.

FIG. 4 is an exemplary diagram depicting various sensors 360 placed on smart eyewear system 300. Sensors 360 include, for example, camera/microphone 400, motion sensor 420, and biometric sensor 460. Camera/microphone 400 provides image data 362 and audio data 364 to cognitive subsystem 305. Motion sensor 420 provides movement data 366 of the user to cognition subsystem 305. And, biometric sensor 460 provides biometric data 368 (e.g., heart rate, etc.) to cognition subsystem 305.

Figure 5:
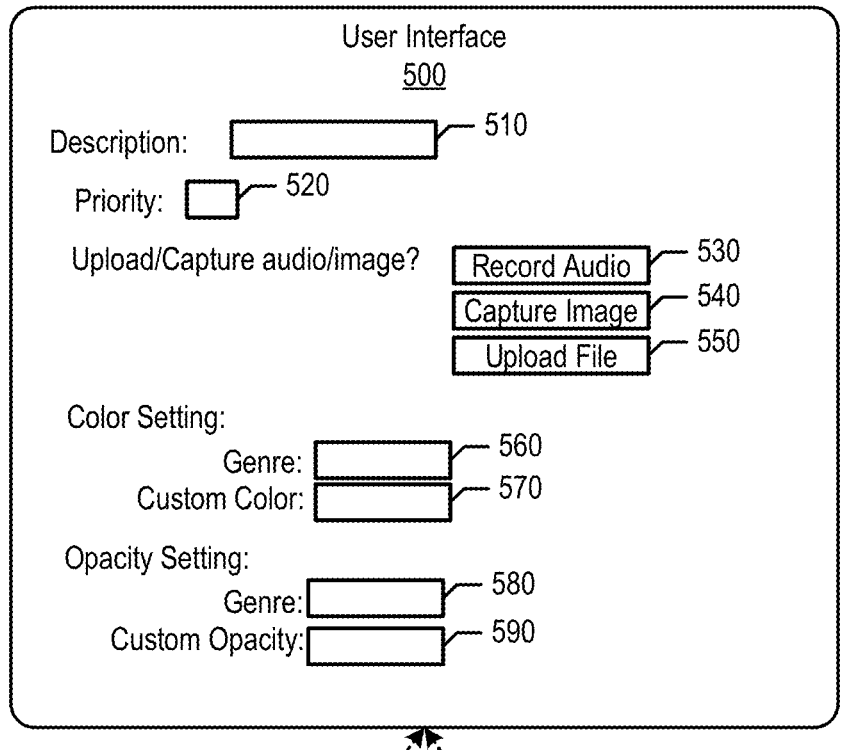
FIG. 5 is an exemplary user interface window that allows a user to configure a smart eyewear system.

FIG. 5 is an exemplary user interface window that allows a user to configure smart eyewear system 300. User interface 500 is viewable on smart eyewear system 300's lenses 380, or is also viewable on device 595. For example, device 595 interfaces to smart eyewear system 300 via Bluetooth and configures smart eyewear system 300 based on inputs received from the user through user interface 500.

User interface 500 includes an area for the user to enter a situational description (box 510), such as "Party", "Colleague", etc. The user enters a corresponding priority of the situation in box 520. The user may record audio (530), capture an image (540), or upload a file (550) to correspond with the situation, such as a picture/audio recording of a supervisor or friend. The user can then set the genre and/or color of the situation (560, 570). For example, instead of setting a specific color, the user can select "Party" setting, "Business" setting, etc. to let smart eyewear system 300 set the color based on pre-configured values. Likewise, the user can set the genre and/or opacity of the situation (580, 590).

Figure 6:
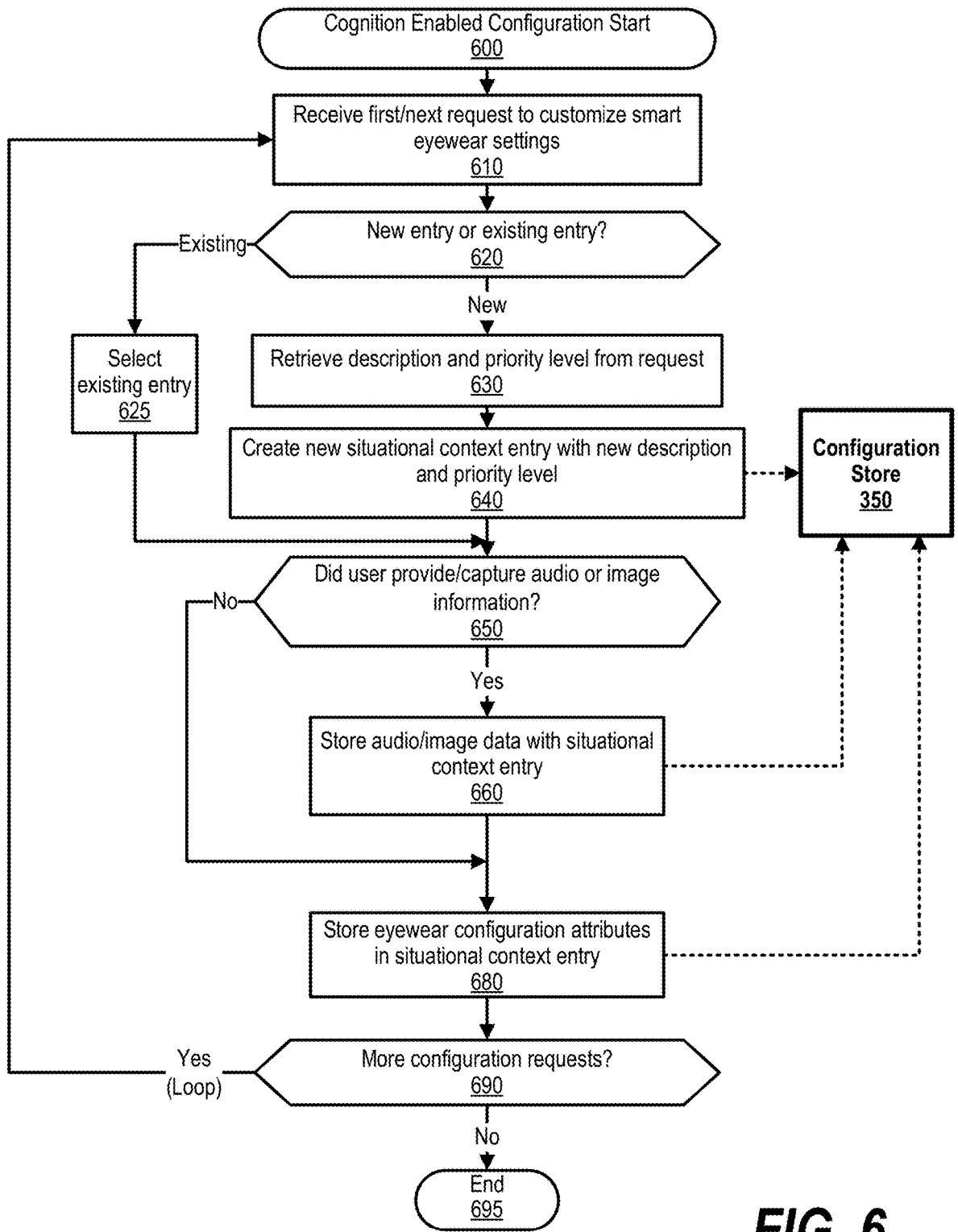
FIG. 6 is an exemplary flowchart showing steps taken to configure a smart eyewear system.

FIG. 6 is an exemplary flowchart showing steps taken to configure smart eyewear system 300. FIG. 6 processing commences at 600 whereupon, at step 610, the process receives a request to customize smart eyewear settings. The process determines as to whether the request corresponds to a new entry or an existing entry (e.g., changing an existing entry) (decision 620). If the request corresponds to an existing entry, then decision 620 branches to the "existing" branch whereupon the process selects the existing entry at step 625. On the other hand, if the request corresponds to a new entry, then decision 620 branches to the "New" branch. At step 630, the process retrieves a description and priority level from the request and, at step 640, the process creates a new situational context entry in configuration store 350 with new title and priority level.

The process determines as to whether the user provided/captured audio or image data (decision 650). If the user provided/captured audio or image data, then decision 650 branches to the 'yes' branch whereupon, at step 670, the process stores the audio/image data with the situational context entry (new or existing). On the other hand, if the user did not provide/capture audio or image information, then decision 650 branches to the 'no' branch bypassing step 660. At step 680, the process stores the eyewear configuration attributes supplied by the user from the user interface into the situational context entry (e.g., color/opacity values).

The process determines as to whether the user initiates more configuration requests (decision 690). If there are more configuration requests, then decision 690 branches to the 'yes' branch which loops back to select and process the next configuration request. This looping continues until there are no more configuration requests to process, at which point decision 690 branches to the 'no' branch exiting the loop. FIG. 6 processing thereafter ends at 695.

FIG. 7 is an exemplary diagram depicting situational context configuration table entries. Situational context configuration table 700 includes situational context entries generated from, for example, a user's configuration session (see FIGS. 5, 6, and corresponding text for further details). In one embodiment, each entry includes a description (710), reference files if supplied (720), a priority level (730), a color value (740), and an opacity value (750).

As discussed above, the entry description is user-defined and the user associates reference files, priority, color (or genre), and opacity (or genre) to each entry. Entry 760 corresponds to the user's friend and an image of the friend (image 1). The user assigned a priority of 2 to the entry. Entry 765 corresponds to the user's supervisor and has an image of the supervisor (image 2) along with an audio of the supervisor speaking (audio 2). The user assigned a priority of 1 to the entry and, as such, if the friend and supervisor are in the same room, smart eyewear system 300 configures the glasses based on the lens appearance properties of the supervisor entry 765 (see FIG. 8 and corresponding text for further details).

Entry 770 corresponds to the user's co-worker and has an image of the co-worker (image 3) with a priority of 1. In one embodiment, when smart eyewear system 300 identifies multiple entries that match the situational context and have the same priority, smart eyewear system 300 selects the most matching entry. For example, if smart eyewear system 300 detects the user's girlfriend, then a "stylish" entry has priority. However, if smart eyewear system 300 also detects the girlfriend's parents, then a "simple" entry is selected even if the entries have same priority because two individuals are identified compared to one individual identified.

Entry 775 corresponds to a party atmosphere and has a set of image data (e.g., banners, flashing lights, etc.), audio (e.g., music), and a keyword file (e.g., typical phrases spoken at a party). The party entry has a priority of 3. Therefore, if the user is at a party with the user's supervisor, smart eyewear system 300 still configures lenses 380 according to entry 765. In one embodiment, the user is able to override the lens appearance properties via, for example, verbal instructions.

Entry 780 corresponds to a business meeting environment and has a set of image data, audio, and keyword files corresponding to business meeting environments. Entry 785 corresponds to a reading environment and includes an image file (e.g., text) and, in one embodiment, also includes a biometric file, such as the user tilting their head downward in a reading position. Entry 790 corresponds to when the user is tired and includes a biometric file, such as a slowing heartrate, bobbing head, etc. Entry 795 corresponds to when the user is having a picture taken and includes an image file, such as a picture of a camera pointing in the direction of the user. In one embodiment, entry 795 also includes an image of an eyepiece so when the user is taking a picture of someone else the lens appearance properties are applied.

Figure 8:
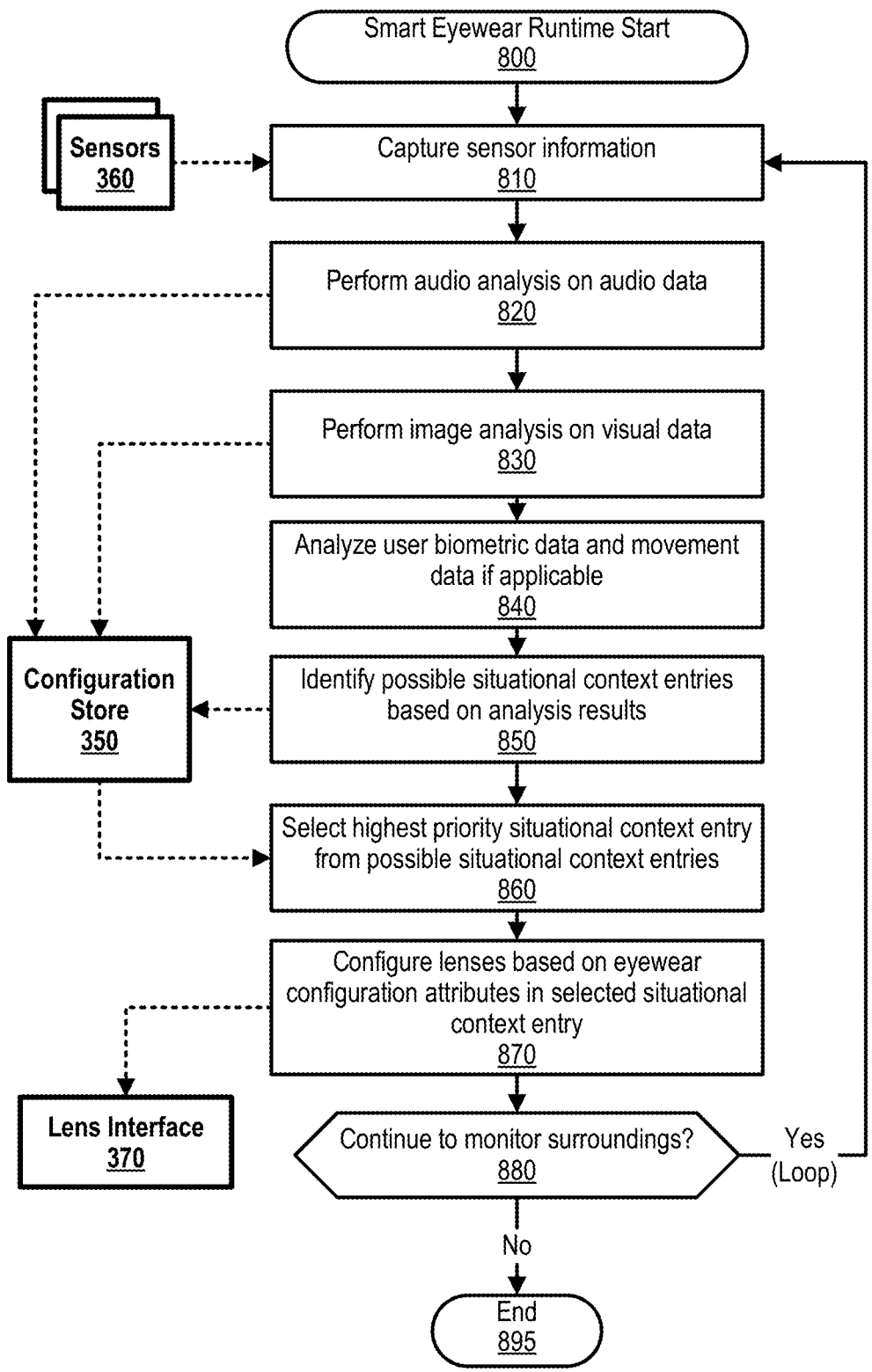
FIG. 8 is an exemplary flowchart depicting steps taken to detect situational contexts and dynamically adjust a smart eyewear system.

FIG. 8 is an exemplary flowchart depicting steps taken to detect situational contexts and dynamically adjust smart eyewear system 300 accordingly. FIG. 8 processing commences at 800 whereupon, at step 810, the process captures sensor information from sensors 360 of the surrounding area (e.g., audio data, image data, etc.) and possibly user biometric and movement data. At step 820, the process performs audio analysis on audio data and, at step 830, the process performs image analysis on image data. For example, the process may compare the captured audio data and image data against audio files and image files in configuration store to determine whether a match exists.

At step 840, the process analyzes user biometric information such as the user's heartbeat, head position, etc. At step 850, the process identifies possible situational context entries based on the analysis in steps 820, 830, and 840. For example, the process may identify situational context entries corresponding to a friend, a supervisor, and a business meeting. At step 860, the process selects a highest priority situational context entry from the possible situational context entries, such as selecting a business meeting situational context entry over a friend situational context entry. At step 870, the process configures lenses 380 via lens interface 370 based on the eyewear configuration attributes stored in the selected situational context entry.

The process determines as to whether to continue to monitor the user's surroundings (decision 880). If the process should continue to monitor the user's surroundings, then decision 880 branches to the 'yes' branch which loops back to capture and process more sensor information. This looping continues until the process should terminate (e.g., the user removes the glasses), at which point decision 880 branches to the 'no' branch exiting the loop. FIG. 8 processing thereafter ends at 895.

Figure 9:
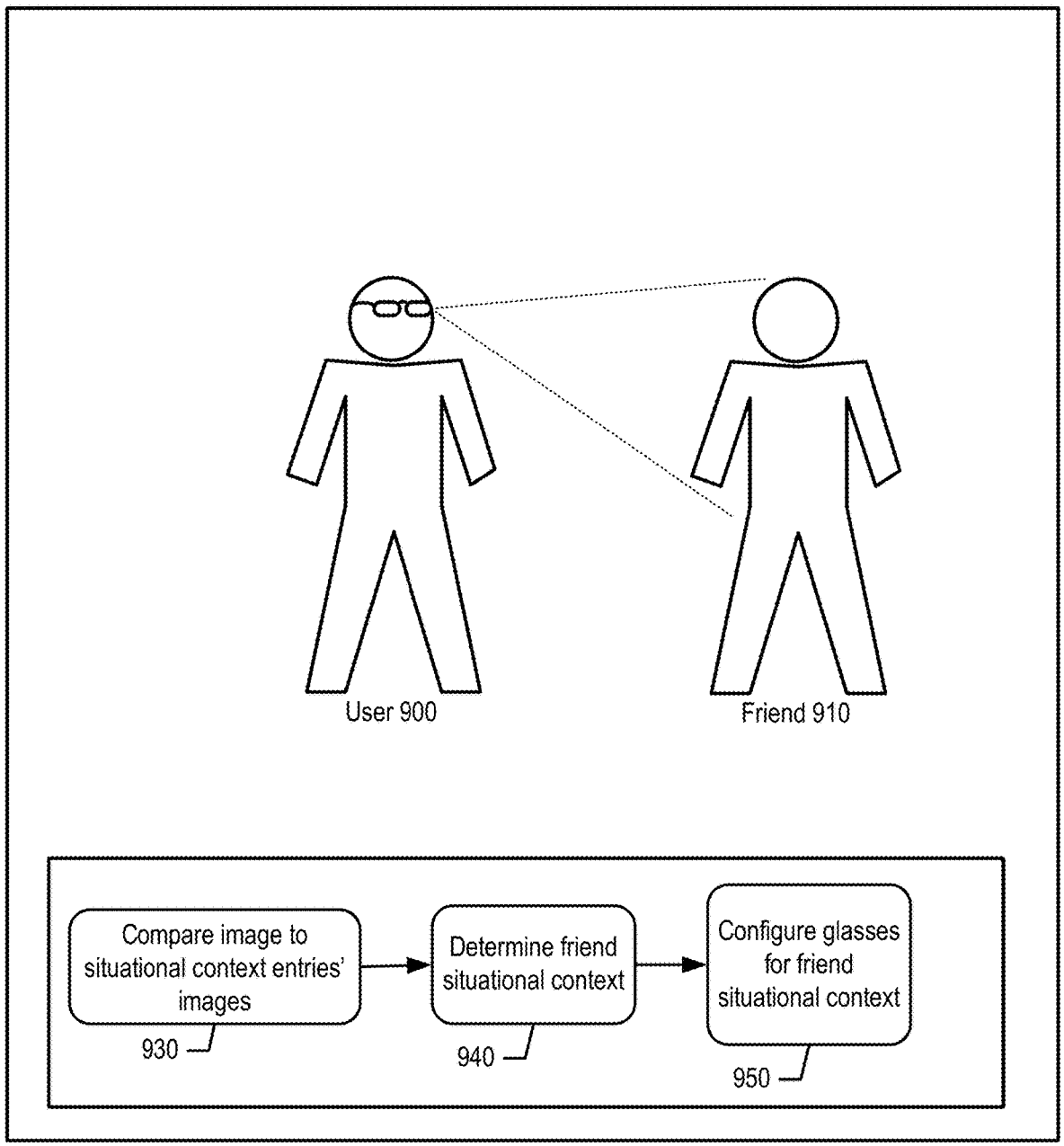
FIG. 9 is an exemplary diagram depicting a smart eyewear system detecting a friend and adjusting lenses accordingly.

FIG. 9 is an exemplary diagram depicting smart eyewear system 300 detecting a friend and adjusting lenses 380 accordingly. Smart eyewear system 300 captures an image of friend 910 and compares the image against the situational context entries' images (930). Smart eyewear system 300 determines that the image matches an image in a friend situational context entry (940) and, in turn, configures lenses 380 based on the eyewear configuration attributes included in the friend's situational context entry (950).

Figure 10:
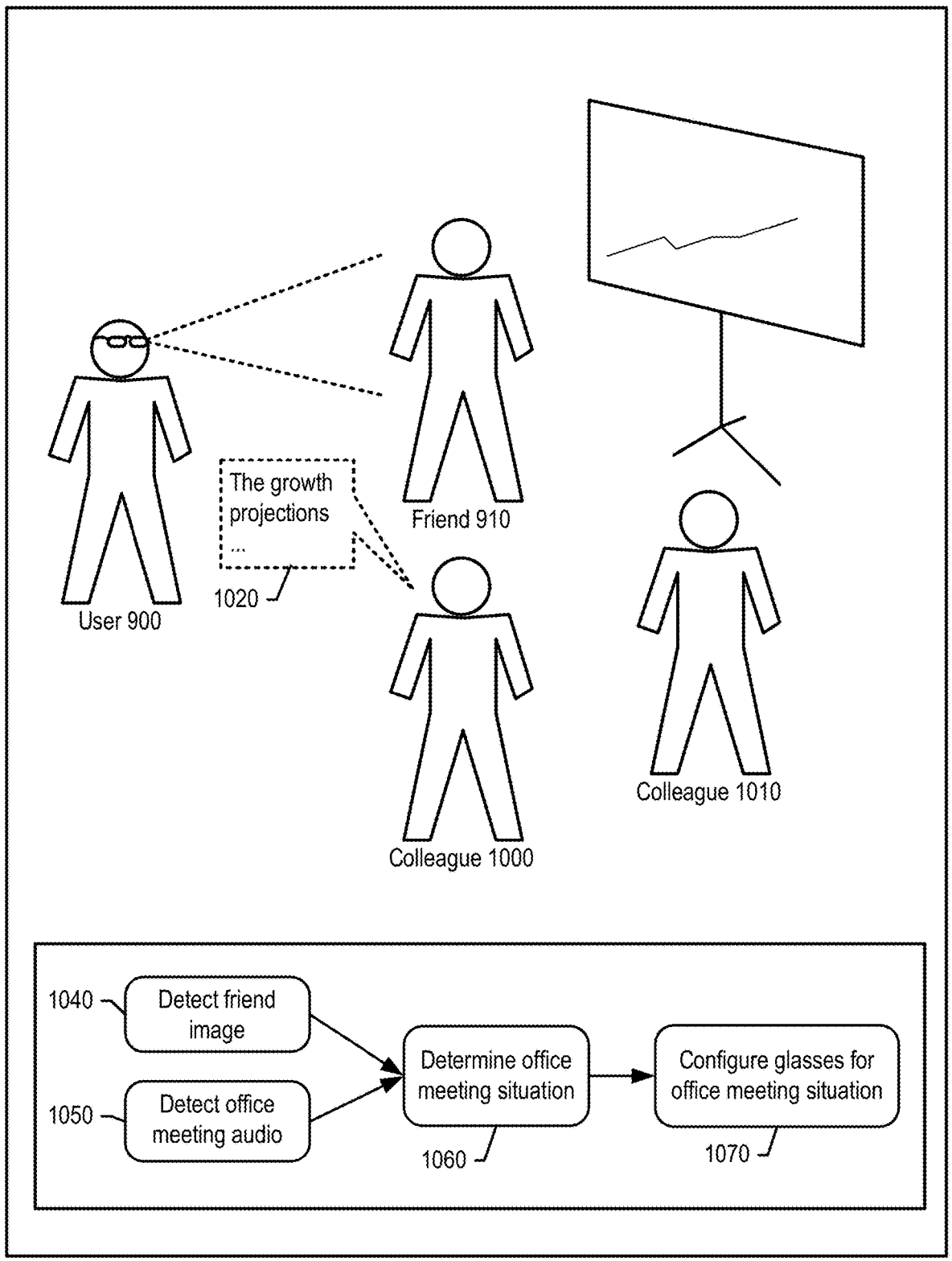
FIG. 10 is an exemplary diagram depicting a smart eyewear system detecting a business environment and adjusting lenses accordingly.

FIG. 10 is an exemplary diagram depicting smart eyewear system 300 detecting a person as well as a business environment and adjusting lenses 380 accordingly. User 900 is in a room with friend 910, colleague 1000, and colleague 1010. Smart eyewear system 300 captures an image of friend 910 and determines it matches a friend situational context entry (1040) (discussed above). In addition, however, smart eyewear system 300 detects audio 1020 and determines that the audio corresponds to a business meeting via, for example, keywords (1050). Smart eyewear system 300 determines that the business meeting situational context entry is at a higher priority than the friend situational context entry (1060) and, in turn, configures lenses 380 based on the eyewear configuration attributes included in the business meeting situational context entry (1070).

Figure 11:
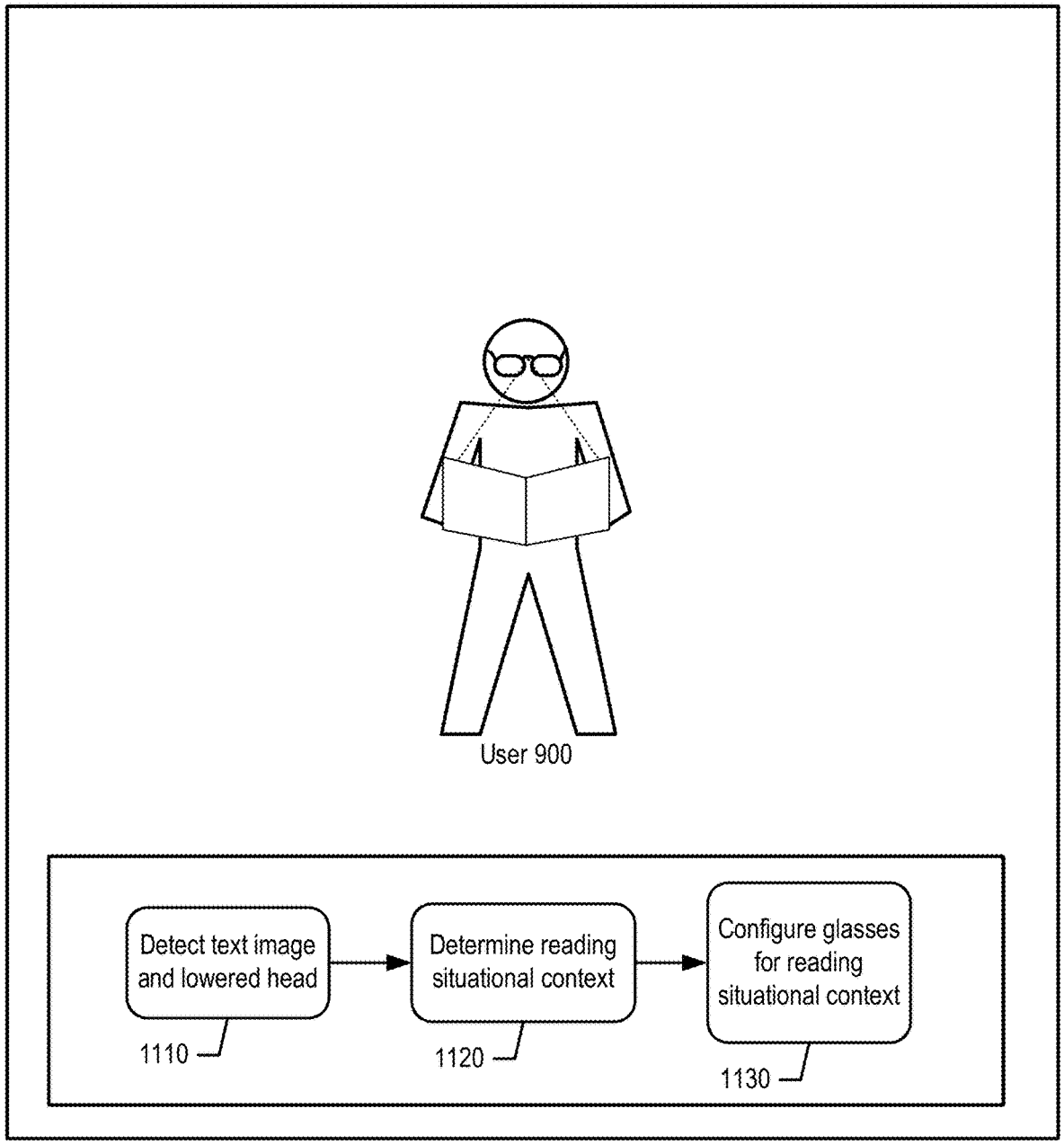
FIG. 11 is an exemplary diagram depicting a smart eyewear system detecting a user reading a newspaper.

FIG. 11 is an exemplary diagram depicting smart eyewear system 300 detecting user 900 reading a newspaper. Smart eyewear system 300 captures an image of a newspaper and performs object recognition to determine that it is a page of text (1110). In addition, smart eyewear system 300 detects that user 900's head is lowered into a reading position (1110). As such, smart eyewear system 300 determines that user 900 is reading based on the object recognition and, in one embodiment, based on user 900's head position (1120). In turn, smart eyewear system 300 configures lenses 380 based on the eyewear configuration attributes included in reading situational context entry (1130).

Figure 12:
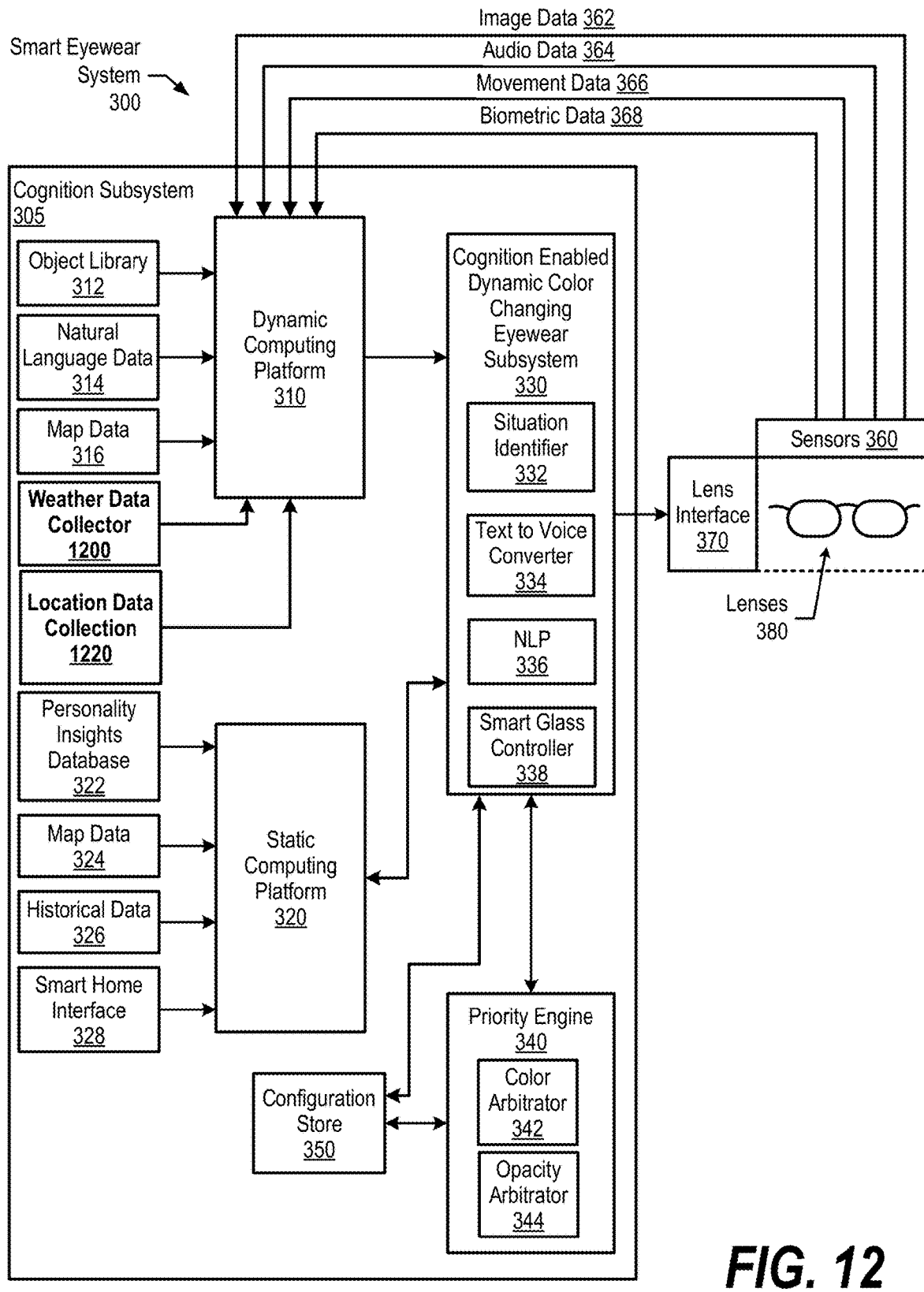
FIG. 12 is an exemplary diagram depicting a smart eyewear system that adjusts color/opacity of lenses in the smart eyewear system based on location contexts.

FIGS. 12 through 20 depict another embodiment of smart eyewear system 300 that collects information from various location, weather, and Internet situated resources via nearby IoT (Internet of Things) enabled devices and adjusts the color and opacity of the lenses based on location contexts. FIG. 12 is similar to FIG. 3 with the addition of weather data collection 1200 and location data collection 1220. In one embodiment, location context includes location-based context and/or as weather-based context.

Weather data collection 1200 and location data collection 1220 collect weather and location information from remote sources and feed the information into dynamic computing platform 310. Dynamic computing platform 310 passes the information to cognition enabled color changing eyewear subsystem 330, which compares the collected information against location context parameters stored in configuration store 350. The location context entries correspond to current/future locations (e.g., tunnels, destination cities, etc.), events (e.g., weddings, funerals, church, etc.), weather conditions (e.g., sunny, cloudy, etc.) and smart eyewear system 300 configures lenses 380 according to a matched location context entry (see FIG. 16 and corresponding text for further details). In one embodiment, smart eyewear system 300 downloads stylish entries based on the user's current location or future location, such as trending colors corresponding to a city that the user is about to visit (see FIG. 14 and corresponding text for further details).

In one embodiment, smart eyewear system 300 selectively tunes the appearance of lenses 380 based on a time for better user experience. For example, smart eyewear system 300 may adjust the opacity of lenses 380 based on a current time and downloaded sunrise/sunset times of the user's location. In another embodiment, smart eyewear system 300 maps collected travel and location changes and updates the appearance of lenses 380 accordingly.

In another embodiment, smart eyewear system 300 receives audio data 364 and maps the color of the lenses 380 accordingly, such as the user specifying a specific color/opacity. In another embodiment, smart eyewear system 300 provides APIs that interact with lens interface 370 and provides the capability to change the color of lenses 380 by invocation of methods in the APIs.

In another embodiment, smart eyewear system 300 detects the user's choices, learns from the choice history, and changes the color autonomously, such as determining that the user requests a stylish look whenever the user is visiting a college campus.

Figure 13:
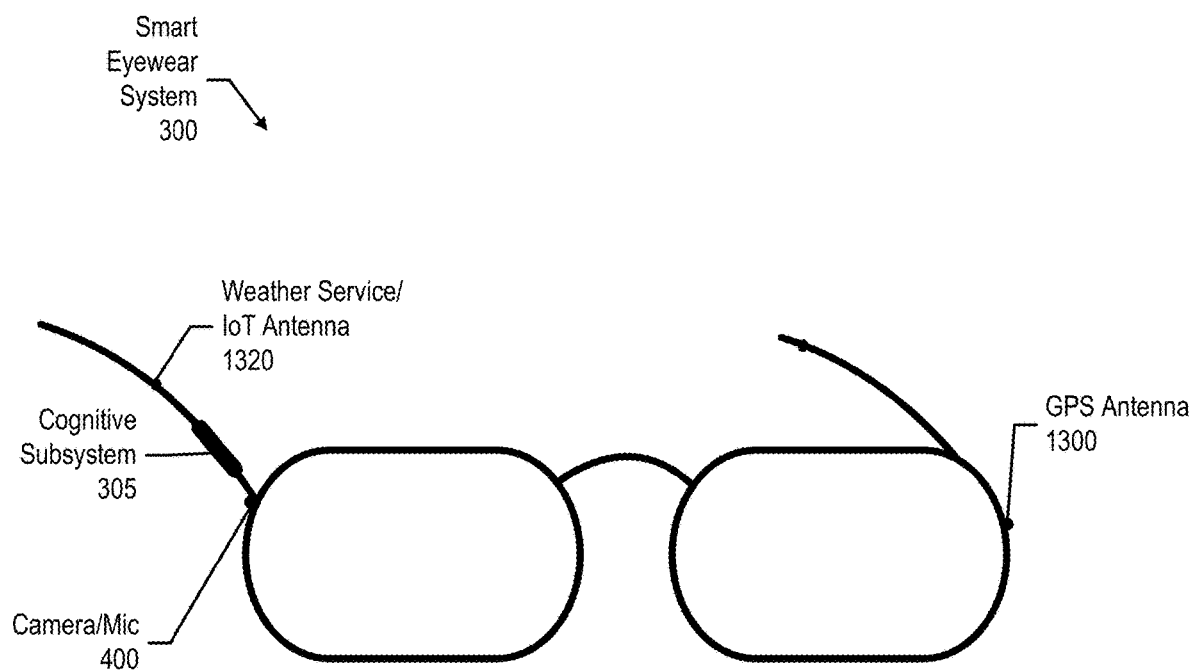
FIG. 13 is an exemplary diagram depicting various components placed on the smart eyewear system to receive location contexts and environmental data.

FIG. 13 is an exemplary diagram depicting various devices placed on smart eyewear system 300 to receive location information and environmental data. FIG. 13 is similar to FIG. 4 with the addition of global positioning system (GPS) antenna 1300 and weather service/IoT (Internet of Things) antenna 1320. In one embodiment, smart eyewear system 300 shown in FIG. 13 also includes motion sensor 420 and biometric sensor 460 as shown in FIG. 4.

GPS antenna 1300 collects location information corresponding to the user's location, which smart eyewear system 300 uses in location context analysis. In one embodiment, smart eyewear system 300 employees 5G technology and receives mobility based inputs over the mobility domain in the 5G network (e.g., via IoT antenna 1320).

Weather service/IoT antenna 1320 receives weather related data and other data relating to the location of the user, such as building/structure types (churches, funeral homes, friend's house, etc.) Smart eyewear system 300 uses the collected data in conjunction with location based data collected through GPS antenna 1300 to determine a location context of the user and adjust lenses 380 accordingly.

In one embodiment, smart eyewear system 300 captures an image of a structure and uploads the image to a remote processing system. In this embodiment, the remote processing system identifies the building, determines the building's location, and sends the building location and building type to smart eyewear system 300. In another embodiment, the remote processing system sends eyewear configuration attributes to smart eyewear system 300 based on the identified building and smart eyewear system 300 applies the received eyewear configuration attributes accordingly.

FIG. 14 is an exemplary user interface window that allows a user to configure smart eyewear system 300 based on location contexts. FIG. 14 is similar to FIG. 5 except that user interface 1400 allows the user to enter location context entries such as those shown in FIG. 16. In one embodiment, smart eyewear system 300 presents the user with a top-level user interface that allows the user to select a location context user interface 1400 or a situational context user interface 500. In another embodiment, the user is presented with a single user interface that allows the user to enter both situational context entries and location context entries.

User interface 1400 is viewable on smart eyewear system 300's lenses 380, or is also viewable on device 595. User interface 1400 includes an area for the user to enter a location/weather description (box 1410), such as "Tunnel", "Church," "Cloudy," "Los Angeles," etc. The user enters a priority level in box 1415, and also has the option of downloading trending colors based on the user's location by selecting box 1420. For example, smart eyewear system 300 may determine that the user is traveling to Paris via a calendar entry and smart eyewear system 300 downloads colors/opacities that are trending in Paris.

The user can also manually set the genre and/or color of the location (1430,1440). Likewise, the user can set the genre and/or opacity of the location (1450,1460). In one embodiment, smart eyewear system 300 matches keyword searches and location details in the form of keywords from location contexts to determine which location context to select (see FIG. 17 and corresponding text for further details).

Figure 15:
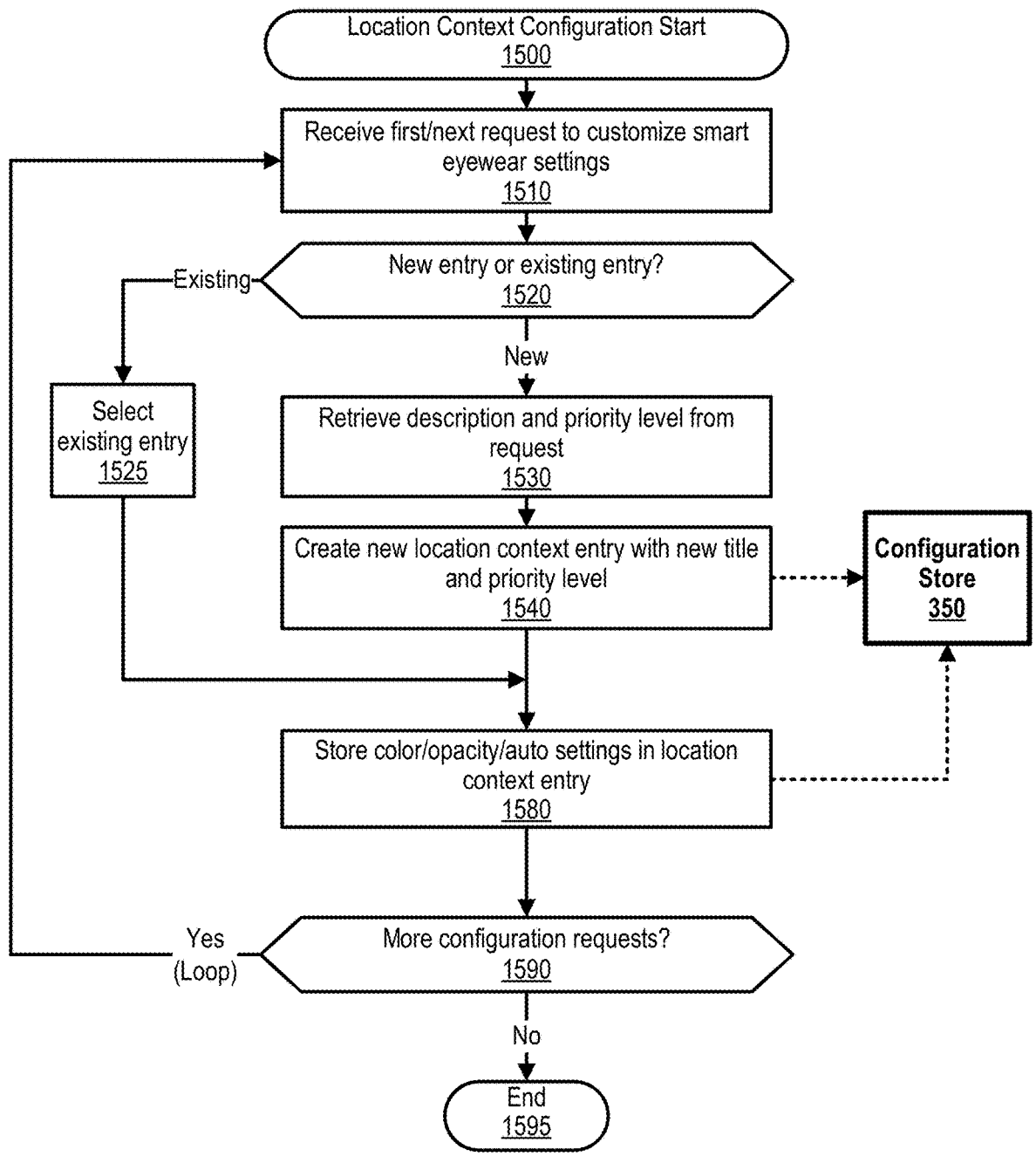
FIG. 15 is an exemplary flowchart showing steps taken to add location context entries into the smart eyewear system.

FIG. 15 is an exemplary flowchart showing steps taken to add location context entries into smart eyewear system 300. FIG. 15 processing commences at 1500 whereupon, at step 1510, the process receives the first request to customize smart eyewear settings. The process determines as to whether the request corresponds to a new entry or an existing entry (decision 1520). If the request corresponds to an existing entry (changing the entry), then decision 1520 branches to the "Existing" branch whereupon the process selects the existing entry at step 1525.

On the other hand, if the request corresponds to a new entry, decision 1520 branches to the "New" branch. At step 1530, the process retrieves a description and priority level from the request. At step 1540, the process creates a new location context entry with a new title and priority level.

At step 1580, the process stores color/opacity/auto settings in the location context entry (either existing entry or new entry). The process determines as to whether the user enters more configuration requests (decision 1590). If the user enters more configuration requests, then decision 1590 branches to the 'yes' branch which loops back to receive and process the configuration request. This looping continues until the user terminates the user interface, at which point decision 1590 branches to the 'no' branch exiting the loop. FIG. 15 processing thereafter ends at 1595.

FIG. 16 is an exemplary diagram depicting location context configuration table entries. As discussed herein, location context includes both location based information and environmental information. Location context configuration table 1600 includes location context entries generated from, for example, a user's configuration session (see FIGS. 14, 15, and corresponding text for further details). Each entry includes a description (1610), keywords, reference files, weather data, location information (1620), a priority level (1630), a color value (1640), and an opacity value (1650).

As discussed above, the entry description is user-defined and the user associates reference files, priority, color (or genre), and opacity (or genre) to each entry.

Figure 17:
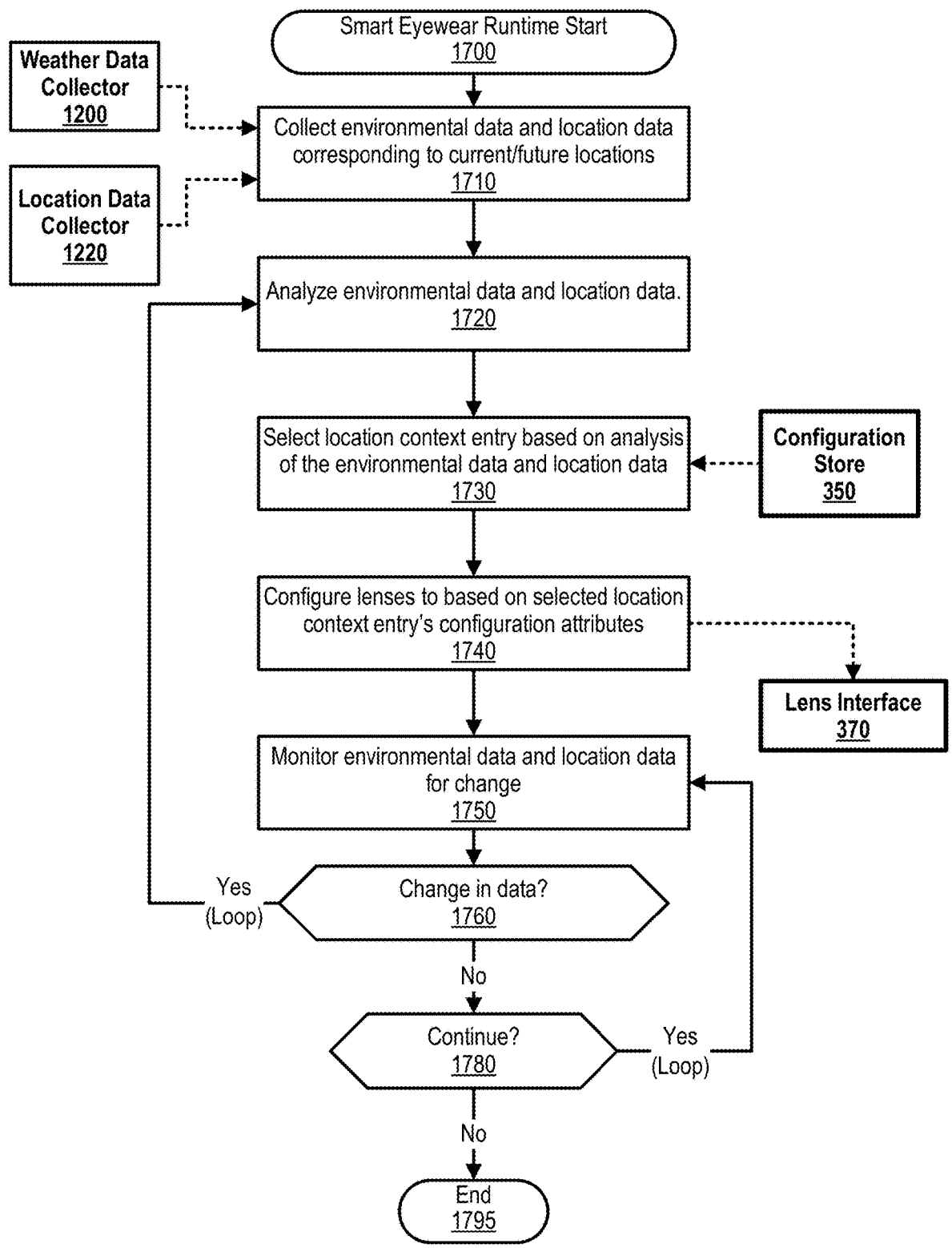
FIG. 17 is an exemplary flowchart depicting steps taken to identify location contexts and dynamically adjust the smart eyewear system accordingly.

FIG. 17 is an exemplary flowchart depicting steps taken to identify location contexts and dynamically adjust smart eyewear system 300 accordingly. FIG. 17 processing commences at 1700 whereupon, at step 1710, the process collects environmental data and location data corresponding to the user's current/future location from weather data collector 1200, location data collector 1220, and other relevant sources. For example, the process receives a calendar entry and determines that the user is traveling to a different location. In turn, the process collects weather data corresponding to the different location (see FIG. 19 and corresponding text for further details).

At step 1720, the process analyzes the environmental data and location data. At step 1730, the process selects a location context entry from configuration store 350 based on the analysis, such as by matching keywords (e.g., sunny, church, State University, etc.). For example, when the collected environmental data indicates that rain is in proximity to the user, the process selects a location context (weather context) entry corresponding to the keyword "rain" or a weather data file that includes rain. In another example, the collected location data indicates that the user is at "State University" and the process selects location context entries corresponding to universities/colleges. At step 1740, the process configures lenses 380 via lens interface 370 to the color and opacity specified in the selected location context entry.

At step 1750, the process monitors the environmental data and location data for changes. For example, the user may be approaching a place of worship and the process determines when the user is within a predetermined range of the place of worship (see FIG. 20 and corresponding text for further details). In another example, a storm may be approaching and the process monitors the direction of the storm relative to the user's location.

The process determines as to whether there is a change in location data or environmental data (decision 1760). If there is a change in data, then decision 1760 branches to the 'yes' branch which loops back to analyze the change in data and select a location context entry accordingly. On the other hand, if there is not a change in data, decision 1760 branches to the 'no' branch.

The process determines as to whether to continue (decision 1780). If the process should continue, then decision 1780 branches to the 'yes' branch which loops back to monitor the location data and environmental data. This looping continues until the process should terminate (e.g., the user removes smart eyewear system 300), at which point decision 1780 branches to the 'no' branch exiting the loop. FIG. 17 processing thereafter ends at 1795.

Figure 18:
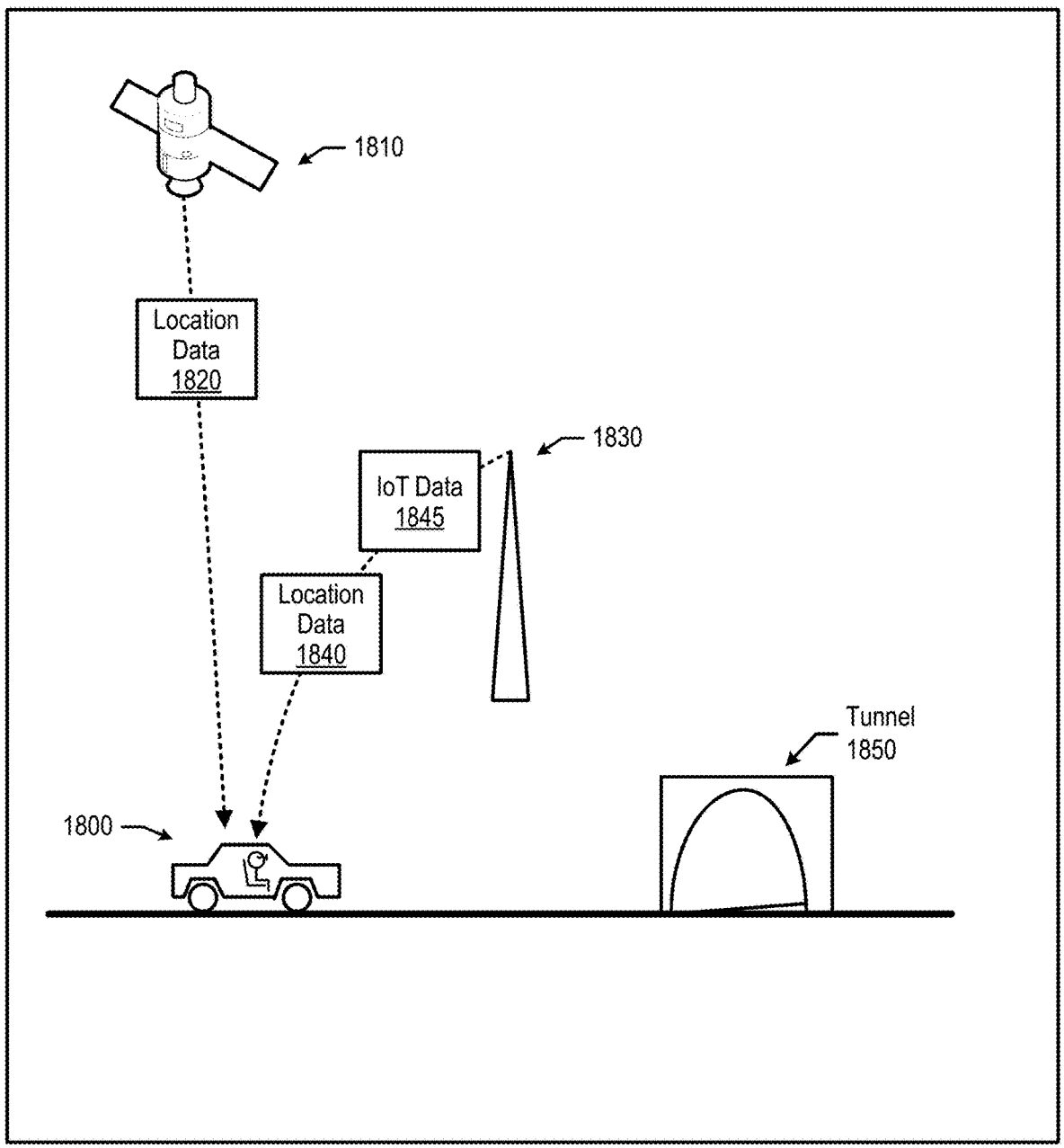
FIG. 18 is an exemplary diagram depicting the smart eyewear system receiving location data and adjusting the lenses accordingly.

FIG. 18 is an exemplary diagram depicting smart eyewear system 300 receiving location data and adjusting lenses 380 accordingly. The user is traveling in vehicle 1800 and receives location data 1820 from GPS satellite 1810 and/or location data 1840 (or IoT data 1845) from tower 1830 (e.g., 5G system). Smart eyewear system 300 determines from the received data that tunnel 1850 is approaching. As such, smart eyewear system 300 selects a location context entry from configuration store 350 that matches a tunnel location and applies the color/opacity settings to lenses 380 accordingly. In one embodiment, smart eyewear system 300 adjusts lenses 380 at a certain distance from tunnel 1850, such as when vehicle 1800 is within 20 feet of tunnel 1850.

Figure 19:
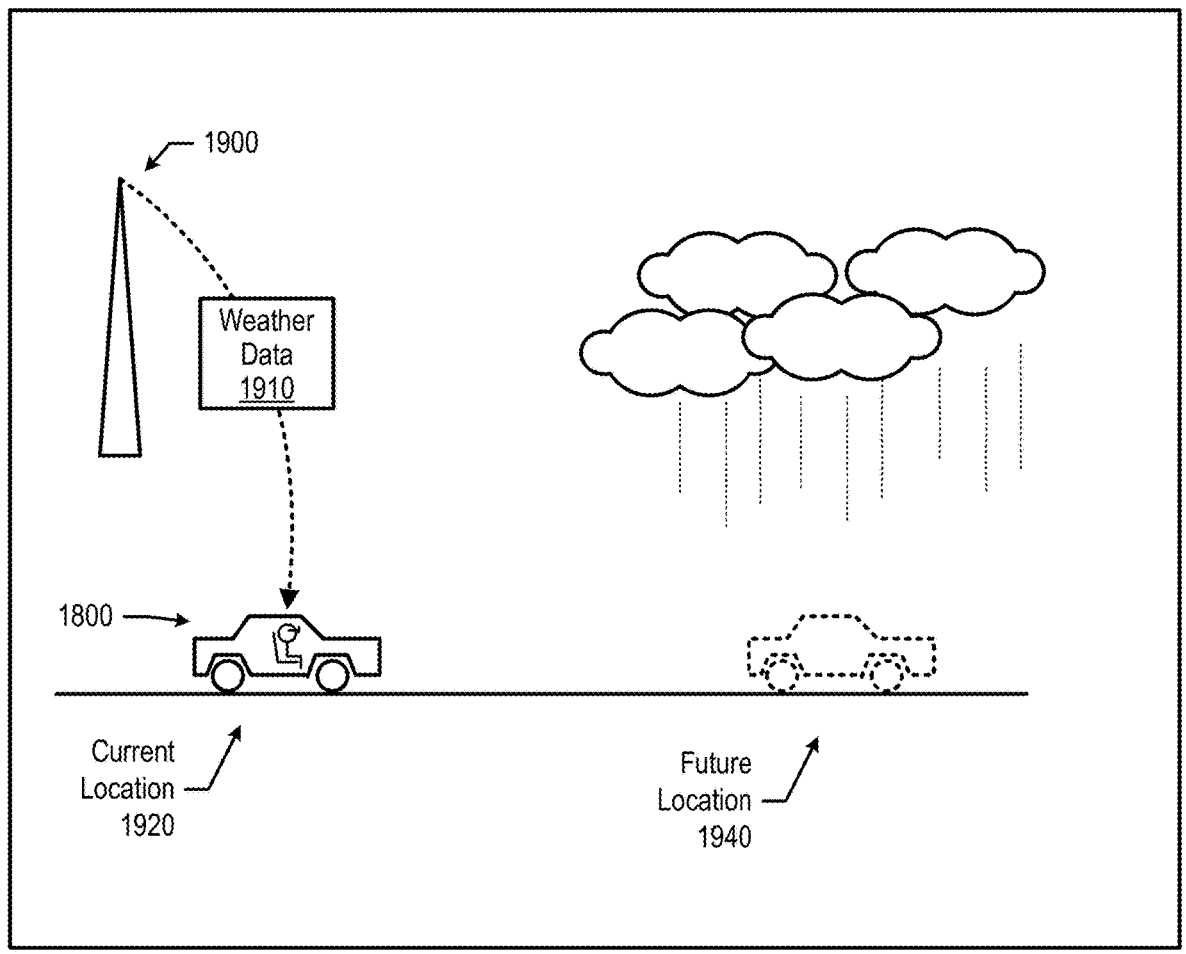
FIG. 19 is an exemplary diagram depicting the smart eyewear system receiving weather data corresponding to a future location and adjusting the lenses accordingly.

FIG. 19 is an exemplary diagram depicting smart eyewear system 300 receiving weather data and adjusting lenses 380 accordingly. The user is traveling in vehicle 1800 at current location 1920. Smart eyewear system 300 determines that the user will be at future location 1940 (e.g., through directional analysis, a calendar entry, etc.). and receives weather data 1910 from tower 1900 corresponding to future location 1940. As such, smart eyewear system 300 selects a location context entry (environmental context entry) from configuration store 350 that matches the weather conditions (or predicted weather conditions) at future location 1940, and applies the color/opacity settings to lenses 380 accordingly. In one embodiment, smart eyewear system 300 adjusts lenses 380 at a certain distance from future location 1940, such as when vehicle 1800 is within 100 feet of future location 1940.

Figure 20:
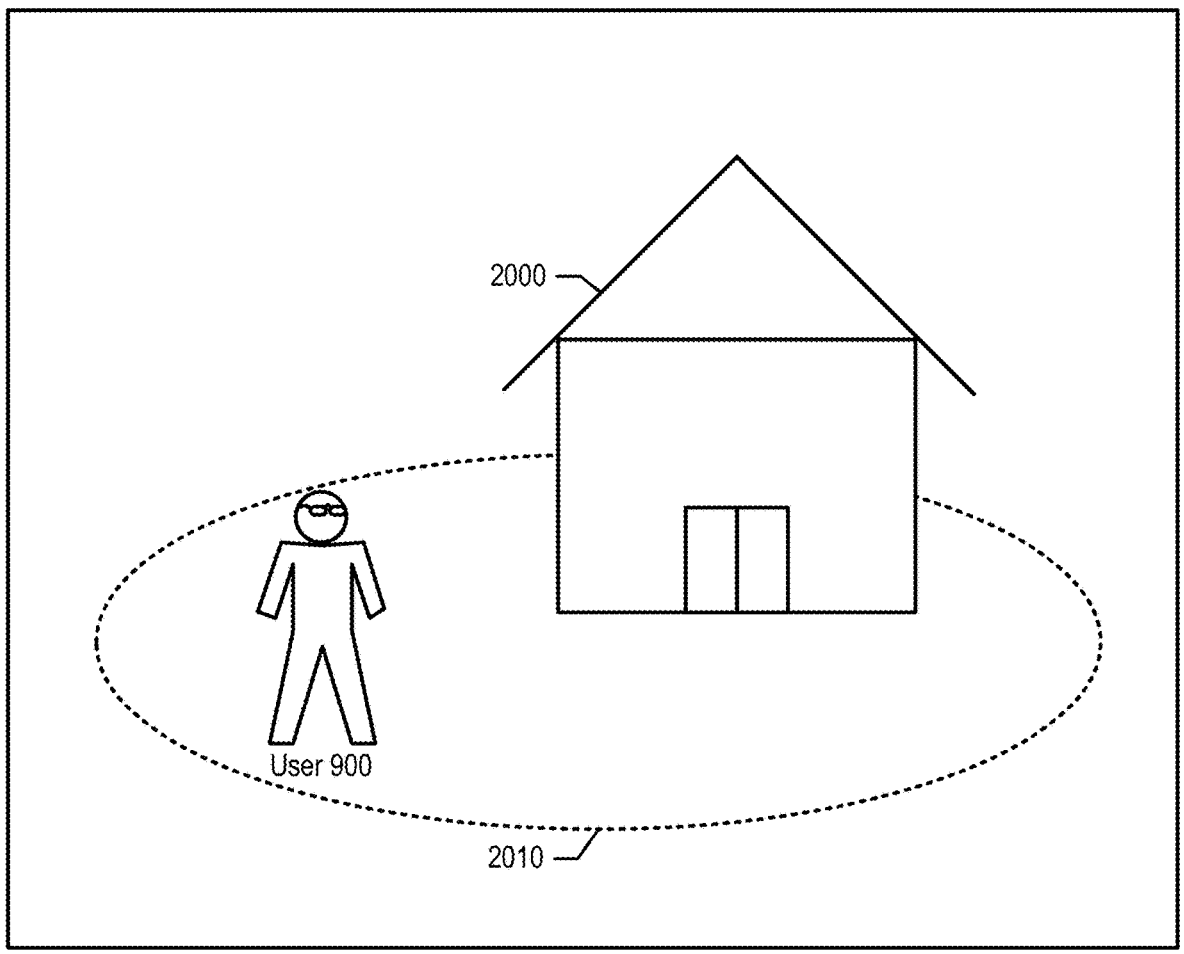
FIG. 20 is an exemplary diagram depicting the smart eyewear system detecting that the user is within a predetermined distance from a type of building and adjusting the lenses accordingly.

FIG. 20 is an exemplary diagram depicting smart eyewear system 300 detecting that the user is within a predetermined distance from a building/structure type and adjusting lenses 380 accordingly. User 900 is traveling to, or walking by, structure 2000. Structure 2000 (or surrounding area) is a particular structure type such as a place of worship, a college campus, a cemetery, etc. Smart eyewear system 300 is configured such that when user 900 is within a particular range 2010 of the type of structure 2000, smart eyewear system 300 configures lenses 380 based on eyewear configuration attributes of a corresponding location context entry. For example, structure 2000 may be a place of worship and smart eyewear system 300 configures lenses 380 to have a clear appearance.

In one embodiment, smart eyewear system 300 selects a location context entry based on priorities. For example, structure 2000 may be a place of worship on a college campus and smart eyewear system 300 configures lenses 380 with a stylish appearance while user 900 is on the college campus except while user 900 is within range 2010, in which case smart eyewear system 300 configures lenses 380 with a clear appearance.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    receiving, by an eyewear system, a set of location data corresponding to a location of a user wearing the eyewear system, wherein the set of location data comprises a first set of location context data and a second set of location context data;
    matching the first set of location context data to a first one of a plurality of location context entries stored in a storage area, wherein the first location context entry comprises a first set of eyewear configuration attributes and a first priority level;
    matching the second set of location context data to a second one of the plurality of location context entries stored in the storage area, wherein the second location context entry comprises a second set of eyewear configuration attributes and a second priority level;
    determining that the first priority level is higher than the second priority level; and
    adjusting an appearance of the eyewear system based on the first set of eyewear configuration attributes in response to the determining.

2. The method of claim 1 wherein:
    the set of location data is received over a wireless network from a remote system;
    the first set of location context data is a set of location-based context data; and
    the second set of location context data is a set of weather-based context data.

3. The method of claim 1 further comprising:
    receiving a third set of location context data corresponding to a future location of the user;
    matching the third set of location context data to a third one of the plurality of location context entries, wherein the third location context entry comprises a third set of eyewear configuration attributes; and
    re-adjusting the appearance of the eyewear system, at a predetermined distance away from the future location, based on the third set of eyewear configuration attributes.

4. The method of claim 3 further comprising:
    retrieving a calendar entry from an electronic calendar corresponding to the user; and
    determining the future location of the user based on the retrieved calendar entry.

5. The method of claim 3 further comprising:
    retrieving environmental data corresponding to the future location of the user; and
    selecting the third location context entry based on the environmental data.

6. The method of claim 3 wherein the future location is selected from the group consisting of a tunnel and an underground parking garage.

7. The method of claim 1 further comprising:
    determining that the first set of location context data corresponds to a type of building;
    matching a third one of the plurality of location context entries to the type of building, wherein the third location context entry comprises a third set of eyewear configuration attributes; and
    adjusting the appearance of the eyewear system based on the third set of eyewear configuration attributes.

8. The method of claim 1 further comprising:
    downloading a set of trending color attributes corresponding to the location of the user; and
    adjusting the appearance of the eyewear system based on the downloaded set of trending color attributes.

9. The method of claim 1 further comprising one or more network situated information resources and one or more computing devices that collect information corresponding to the location of the user and instruct the eyewear system to adjust a color and an opacity of the eyewear system.

10. The method of claim 9 further comprising:
    receiving, at the eyewear system, a third set of eyewear configuration attributes from at least one of the one or more information resources; and
    adjusting a different appearance of the eyewear system based on the third set of eyewear configuration attributes.

11. An information handling system comprising:
    one or more processors;
    a memory coupled to at least one of the processors;
    a set of computer program instructions stored in the memory and executed by at least one of the processors in order to perform actions of:
        receiving, by an eyewear system, a set of location data corresponding to a location of a user wearing the eyewear system, wherein the set of location data comprises a first set of location context data and a second set of location context data;
        matching the first set of location context data to a first one of a plurality of location context entries stored in a storage area, wherein the first location context entry comprises a first set of eyewear configuration attributes and a first priority level;
        matching the second set of location context data to a second one of the plurality of location context entries stored in the storage area, wherein the second location context entry comprises a second set of eyewear configuration attributes and a second priority level;
        determining that the first priority level is higher than the second priority level; and
        adjusting an appearance of the eyewear system based on the first set of eyewear configuration attributes in response to the determining.

12. The information handling system of claim 11 wherein:
    the set of location data is received over a wireless network from a remote system;
    the first set of location context data is a set of location-based context data; and
    the second set of location context data is a set of weather-based context data.

13. The information handling system of claim 11 wherein the processors perform additional actions comprising:

receiving a third set of location context data corresponding to a future location of the user;

matching the third set of location context data to a third one of the plurality of location context entries, wherein the third location context entry comprises a third set of eyewear configuration attributes; and re-adjusting the appearance of the eyewear system, at a predetermined distance away from the future location, based on the third set of eyewear configuration attributes.

14. The information handling system of claim 13 wherein the processors perform additional actions comprising:

retrieving a calendar entry from an electronic calendar corresponding to the user; and determining the future location of the user based on the retrieved calendar entry.

15. The information handling system of claim 13 wherein the processors perform additional actions comprising:

retrieving environmental data corresponding to the future location of the user; and selecting the different third location context entry based on the environmental data.

16. The information handling system of claim 11 wherein the processors perform additional actions comprising:

determining that the first set of location context data corresponds to a type of building;

matching a third one of the plurality of location context entries to the type of building, wherein the third location context entry comprises a third set of eyewear configuration attributes; and adjusting the appearance of the eyewear system based on the third set of eyewear configuration attributes.

17. The information handling system of claim 11 wherein the processors perform additional actions comprising:

downloading a set of trending color attributes corresponding to the location of the user; and adjusting the appearance of the eyewear system based on the downloaded set of trending color attributes.

18. A computer program product stored in a computer readable storage medium, comprising computer program code that, when executed by an information handling system, causes the information handling system to perform actions comprising:

receiving, by an eyewear system, a set of location data corresponding to a location of a user wearing the eyewear system, wherein the set of location data comprises a first set of location context data and a second set of location context data;

matching the first set of location context data to a first one of a plurality of location context entries stored in a storage area, wherein the first location context entry comprises a first set of eyewear configuration attributes and a first priority level;

matching the second set of location context data to a second one of the plurality of location context entries stored in the storage area, wherein the second location context entry comprises a second set of eyewear configuration attributes and a second priority level;

determining that the first priority level is higher than the second priority level; and adjusting an appearance of the eyewear system based on the first set of eyewear configuration attributes in response to the determining.

19. The computer program product of claim 18 wherein:

the set of location data is received over a wireless network from a remote system;

the first set of location context data is a set of location-based context data; and the second set of location context data is a set of weather-based context data.

20. The computer program product of claim 18 information handling system performs further actions comprising:

receiving a third set of location context data corresponding to a future location of the user;

matching the third set of location context data to a third one of the plurality of location context entries, wherein the third location context entry comprises a third set of eyewear configuration attributes; and re-adjusting the appearance of the eyewear system, at a predetermined distance away from the future location, based on the third set of eyewear configuration attributes.

* * * * *